(12) United States Patent
Hein et al.

(10) Patent No.: US 6,536,928 B1
(45) Date of Patent: Mar. 25, 2003

(54) MULTI-COLORED VEHICLE INTERIOR LIGHTING

(75) Inventors: David Anthony Hein, Sterling Heights, MI (US); Michael J. Berta, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/798,253

(22) Filed: Mar. 2, 2001

Related U.S. Application Data

(60) Provisional application No. 60/186,883, filed on Mar. 3, 2000.

(51) Int. Cl.$^7$ ................................................. B60Q 3/02
(52) U.S. Cl. ...................... 362/464; 362/488; 362/491; 362/501; 116/28.1
(58) Field of Search ................. 362/464, 488, 362/491, 501; 116/28.1

(56) References Cited

U.S. PATENT DOCUMENTS

| | | | | |
|---|---|---|---|---|
| 4,137,864 A | * | 2/1979 | Lauper ........................ 116/28.1 |
| 4,343,032 A | * | 8/1982 | Schwartz ..................... 362/276 |
| 4,812,814 A | | 3/1989 | Elliott .......................... 340/332 |
| 5,066,929 A | | 11/1991 | Frantz .......................... 331/57 |
| 5,130,901 A | * | 7/1992 | Priesemuth .................. 315/156 |
| 5,143,437 A | * | 9/1992 | Matsuno et al. ............. 315/156 |
| 5,149,186 A | * | 9/1992 | Matsuno et al. ............. 315/152 |
| 5,149,187 A | * | 9/1992 | Matsuno et al. ............. 200/314 |
| 5,194,854 A | | 3/1993 | Havel ....................... 340/815.1 |
| 5,434,757 A | * | 7/1995 | Kashiwagi ................... 296/97.5 |
| 5,438,491 A | * | 8/1995 | White ........................ 116/28.1 |
| 5,453,731 A | | 9/1995 | Beyer .......................... 340/438 |
| 5,477,436 A | | 12/1995 | Bertling et al. ............. 362/231 |
| 5,490,048 A | | 2/1996 | Brassier et al. ............. 362/338 |
| 5,546,290 A | | 8/1996 | Gonzalez et al. ............ 362/223 |
| 5,619,182 A | | 4/1997 | Robb ........................... 340/479 |
| 5,647,657 A | | 7/1997 | Damasky et al. .............. 362/32 |
| 5,671,996 A | | 9/1997 | Bos et al. ................... 362/83.1 |
| 5,677,603 A | | 10/1997 | Speirs et al. ................. 315/324 |
| 5,770,998 A | | 6/1998 | Choi et al. ................... 340/403 |
| 5,816,681 A | | 10/1998 | Tedesco ........................ 362/80 |
| 5,844,479 A | | 12/1998 | Walton ........................ 340/479 |
| 5,900,678 A | | 5/1999 | Rodgers ....................... 307/10.1 |
| 5,938,321 A | | 8/1999 | Bos et al. .................... 362/494 |
| 5,973,593 A | * | 10/1999 | Botella ........................ 362/276 |
| 6,000,822 A | | 12/1999 | Polizzi et al. ............... 362/488 |
| 6,164,792 A | * | 12/2000 | Nakagome ................... 362/276 |
| 6,193,398 B1 | * | 2/2001 | Okuchi et al. .............. 340/438 |
| 6,252,500 B1 | * | 6/2001 | Chueh et al. ................ 340/438 |

FOREIGN PATENT DOCUMENTS

GB 2139340 A 11/1984

* cited by examiner

Primary Examiner—Sandra O'Shea
Assistant Examiner—Ismael Negron
(74) Attorney, Agent, or Firm—MacMillan, Sobanski & Todd, LLC

(57) ABSTRACT

A vehicle lighting system includes a sensor to detect a first set of conditions and a second set of conditions. The vehicle lighting system also includes a light emitting source. The light emitting source is operable to illuminate selectively between a first lighting characteristic and a second lighting characteristic. The light emitting source is adapted to be actuated at the first lighting characteristic in response to a first signal operatively generated by the sensor indicating the first set of conditions. The light emitting source is also adapted to be actuated at the second lighting characteristic in response to a second signal operatively generated by the sensor indicating the second set of conditions.

26 Claims, 2 Drawing Sheets

MULTI-COLORED VEHICLE INTERIOR LIGHTING

CROSS REFERENCE TO RELATED APPLICATIONS

This application claims the benefit of U.S. Provisional Application No. 60/186,883 filed Mar. 3, 2000.

BACKGROUND

The use of light emitting sources in an automobile vehicle interior is known in the art. Such light emitting sources can be located at convenient locations in the vehicle passenger compartment, trunk, engine compartment, or other useful area. The light emitting sources are useful to illuminate one or more portions of the vehicle interior at strategic times. For example, when a vehicle is parked, a light emitting source in the passenger compartment may be useful to assist the automobile driver in fastening seat belts, locating and using ignition keys, adjusting mirrors, reading instrument panels, and the like.

Unfortunately, while the light emitting sources are very useful, they can cause glare. The glare can be distracting and potentially dangerous, particularly when the vehicle is in motion. The glare can occur for a number of reasons, including but not limited to imprecise location of the light emitting sources in the vehicle interior, reflection of beams from the light emitting sources onto one or more reflective surfaces in the vehicle interior, or the like. The glare can also be caused by the use of light emitting source that emit generally white light at inopportune moments.

Light emitting sources that are used in a vehicle interior typically emit generally white light. It would be desirable to design a lighting system that employed one or more light emitting sources that emit light that is colored, particularly in response to conditions where white light is undesirable.

SUMMARY OF THE PREFERRED EMBODIMENTS

The above advantages as well as other advantages not specifically enumerated are achieved by a vehicle lighting system. The vehicle lighting system includes a sensor to detect a first set of conditions and a second set of conditions. The vehicle lighting system also includes a light emitting source. The light emitting source is operable to illuminate selectively between a first lighting characteristic and a second lighting characteristic. The light emitting source is adapted to be actuated at the first lighting characteristic in response to a first signal operatively generated by the sensor indicating the first set of conditions. The light emitting source is also adapted to be actuated at the second lighting characteristic in response to a second signal operatively generated by the sensor indicating the second set of conditions.

DETAILED DESCRIPTION OF THE PREFERRED EMBODIMENTS OF THE INVENTION

Figure 1:
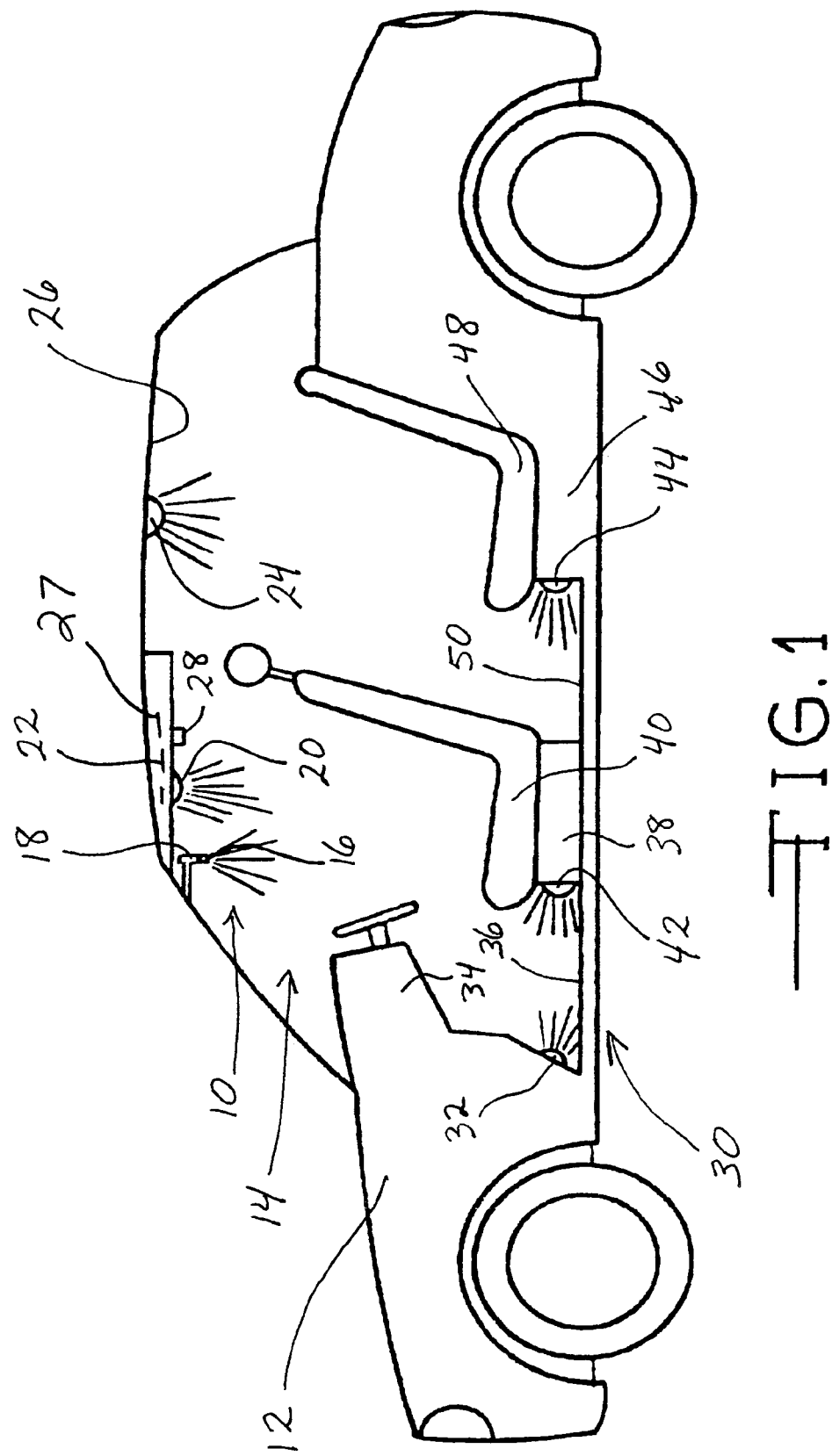
FIG. 1 is a schematic elevational view f an automobile with the lighting system according to the invention.

This invention relates in general to lighting systems for vehicles, and in particular to the use of multi-colored lighting in various vehicle interior systems. In a first embodiment of the invention, the vehicle interior lighting system is automatically adjustable to change the color of the lighting depending on the outdoor lighting level, e.g., for nighttime driving conditions versus daytime driving conditions. It is often desirable when driving at night to have lighting in the interior of the vehicle for reading, viewing controls or instrumentation, finding items, or for some other reason. Conventional vehicle lighting includes an overhead lamp which emits a white-colored light. Unfortunately, the white-colored light creates high levels of unwanted glare during nighttime driving. The use of such conventional white-colored lighting may undesirable during nighttime driving because of the high glare levels produced.

The present invention addresses this problem by providing a vehicle interior lighting system, or lighting system, which is automatically adjustable to illuminate selectively between a first lighting characteristic and a second lighting characteristic. The term "lighting characteristic" is understood here to include lighting color or lighting intensity. Lighting intensity includes variations in luminous intensity, or candle power, as is often expressed in units of candles. For purposes of clarity in presentation, the structure and operation of the vehicle interior lighting system of the invention will be discussed primarily in terms of illumination variations in lighting color, though the invention is also easily adaptable to lighting intensity. It should be understood that variations of the lighting color and the lighting intensity are not mutually exclusive. Indeed, the lighting color can be varied with or without a variation in the lighting intensity, and vice versa.

The lighting system is thus automatically adjustable to emit a light having a non-glare producing color during relatively low outdoor illumination or lighting conditions, e.g., nighttime driving conditions. The light can be automatically switched to a conventional white color during outdoor lighting levels which would not normally produce undesirable glare, such as dusk, dawn, or daytime driving conditions. Additionally, the light can be manually changed to any desirable color. In the embodiment shown in FIG. 1 and FIG. 2, a lighting system according to the invention is indicated generally at 10. The lighting system 10 is mounted on a vehicle 12, and it is directed to illuminate all or a portion of a vehicle interior 14. The lighting system 10 includes one or more light emitting sources, which can be mounted at any suitable location(s) on the vehicle 12, usually in the vehicle interior 14, to illuminate the interior. Some nonlimiting examples of suitable location(s) include the ceiling, the door panels, the quarter window areas, the instrument panel, the rearview mirror, an overhead console or a shift lever console of the vehicle. In the illustrated embodiment, a first light emitting source 16 is mounted on the rearview mirror 18 of the vehicle 12. A second light emitting 20 source is an overhead lamp mounted on an overhead console 22 of the vehicle. A third light emitting source 24 is a rear lamp mounted on the rear portion of the ceiling 26 of the vehicle 12. The lighting system 10 may include any suitable type, number and placement of the light emitting sources.

The light emitting source is adapted to be actuated to emit a light having a non-glare producing color during low level lighting driving conditions. The term "non-glare producing color" in this context generally means any color which does not cause an undesirable glare to the driver of the vehicle when the vehicle is driven at night. Some nonlimiting examples of non-glare producing colors are red, blue and green. The non-glare producing color can be a single color or a plurality of colors. Preferably, the non-glare producing color is a red color. The light emitting source is also adapted to be actuated to emit a light having a general illumination color during relatively high light levels, such as daytime driving conditions. The term "general illumination color" in this context means any color suitable for providing optimum lighting conditions in the vehicle regardless of glare. Some nonlimiting examples of general illumination colors are white and yellow. Generally, white light has a higher illumination than non-white colors. The general illumination color can be a single color or multiple colors. Preferably, the general illumination color is a white color.

The light emitting source can be any type of apparatus which is adapted to emit visible light of the desired color(s). Some nonlimiting examples of suitable light emitting sources are incandescent lamps (e.g., light bulbs), fluorescent lamps, neon lamps, light emitting diode "LED", and electroluminescent lamps (both organic and inorganic). The light emitting source can be in the form of a bulb, a tube, or any other suitable lighting structure. A filter 27 or other color-modifying device can be positioned and adapted with the light emitting source to obtain the desired color. For example, a red filter may be selectively moved in the path of a light emitting source omitting a general illuminating color, such as white light. The light emitting source is preferably operable to illuminate selectively between a first lighting characteristic and a second lighting characteristic. The light emitting source is preferably adapted to be actuated at the first lighting characteristic in response to a first signal operatively generated by the sensor indicating the first set of conditions, and the second lighting characteristic in response to a second signal operatively generated by the sensor indicating the second set of conditions. The light emitting source may employ one or more filters to alter the color of the light from the light emitting source. It will be appreciated that the light emitting source is a light.

Preferably, the light emitting source is a light emitting diode "LED." An LED includes a semiconductor diode that converts electric energy into electromagnetic radiation at visible and near-infrared wavelengths by electroluminescence at a forward-biased pn junction. Some nonlimiting examples of semiconductor materials used in LED's are gallium arsenide (GaAs), gallium arsenide phosphide (GaAsP), gallium phosphide (GaP), and gallium nitride (GaN). The type of semiconductor material used generally determines the wavelength of the radiated light and thus, the color. For example, GaAsP produces either red or yellow light, and GaP produces either yellow or green light. The LED can be equipped with multiple diodes with different semiconductor materials to emit multiple colors, either separately or simultaneously. For example, the LED can be a bicolor or tricolor LED. One suitable tricolor LED (red, green and blue) is sold by Nichia America Corporation, 3775 Hempland Road, Mountville, Pa. Alternatively, a light tube having a first colored bulb (e.g., a red bulb) on one end and a second colored bulb (e.g., a white bulb) on the other end which emit light to a common reflective surface can be used instead of a bicolor (e.g., red and white) LED. The light emitting source can be connected by appropriate electrical connections to the power system of the vehicle. The vehicle power system is typically connected to a 12-volt or 42-volt DC battery, though any suitable power source may be used.

As shown in FIG. 1, a sensor 28 is preferably mounted on the vehicle 12 to detect the light level of the interior of the vehicle or outdoor light level. In the illustrated embodiment, the sensor 28 is mounted on the overhead console 22, although it could be mounted at any suitable interior or exterior location on the vehicle 12. The sensor 28 can be any type of sensing device which is capable of differentiating between various levels of light intensity, such as between daytime and nighttime conditions. A nonlimiting example of a suitable sensing device is a photo sensor which detects the level of light outside the vehicle, or the level of light entering the vehicle from outside, to determine daytime conditions versus nighttime conditions. The term "daytime conditions" is understood to include any set of lighting conditions which are not nighttime conditions. The term "nighttime conditions" is understood to include any set of lighting conditions which are representative of a light level any time of the day in which the amount of light entering the vehicle from outside is less than a predetermined level. Nonlimiting examples of "nighttime conditions" may include early evening or dusk, and darkness caused by storms during the daytime and the like. Preferably, the appropriate conditions can be preselected by the driver of the vehicle.

The sensor 28 is adapted to send a signal to the light emitting source(s) to change the color of the lighting depending on the detected light level. By way of illustrating one of many uses of the lighting system 10, the sensor 28 may send a signal to the light emitting source to switch from a white color to a red color when the lighting conditions change from daytime conditions to nighttime conditions, and to switch from a red color to a white color when the conditions change from nighttime conditions to daytime conditions.

Alternatively, an additional sensor (not shown) can be provided to detect motion of the vehicle so that the switching of the light color depends on both vehicle motion and nighttime versus daytime conditions. For example, a signal may be sent to the light emitting source to switch from a white color to a red color only when the vehicle is in motion and the outdoor light levels are relatively low. The vehicle can be equipped with suitable electronic devices, such as a switch (not shown) for the light emitting source, and a controller (not shown) to receive the signals from the sensor and to send actuating signals to the light emitting source, to change the color of the light depending on the detected conditions. Appropriate electrical connections are provided. The lighting system 10 may include any suitable type, number and placement of the sensor. The sensor is preferably mounted to detect an illumination level. In a preferred embodiment, the sensor is capable of indicating that the illumination level is below a predetermined value and producing a signal so indicating. In a preferred embodiment, the sensor is capable of indicating that the illumination level is above a predetermined value and producing a signal so indicating. The sensor may also be positioned and adapted to detect the gear state of a transmission of the vehicle. The sensor may also be positioned and adapted to detect the whether a weight, such as for example an occupant, is positioned in the seat in the vehicle 12.

In a second embodiment of the invention, the vehicle lighting system 10 provides accent lighting to the interior of the vehicle, or to focused areas of the vehicle interior 14. For instance, the vehicle lighting system 10 can provide accent lighting to the floor of the vehicle. It has recently been postulated that, when the floor of the vehicle is a light color or illuminated with light, the vehicle occupants perceive the vehicle as feeling more "roomy." In the embodiment shown in FIG. 1, a vehicle floor lighting system according to the invention is indicated generally at 30. The floor lighting system 30 includes a first floor light 32 mounted underneath the instrument panel 34 of the vehicle 12. The first floor light 32 shines light on the front floor area 36 and the base 38 of the front seat 40. A second floor light 42 is mounted on the base 38 of the front seat 40, and shines light on the front floor area 36 and the area underneath the instrument panel 34. A third floor light 44 is mounted on the base 46 of the rear seat 48, and shines light on the rear floor area 50 and the base 38 of the front seat 40. The floor lights 32, 42 and 44 can be any light emitting sources, such as those described above in relation to the first embodiment of the invention. The floor lighting system 30 may include any suitable type, number and placement of the light emitting sources.

The color of the lighting can be selectively varied to accent the color of different features of the vehicle interior 14. For example, the color can be selected so that it coordinates with the interior trim, or with the color of the carpet on the vehicle floor. The lighting can be a single color or multiple colors. The lights can be equipped with switches to allow the color to be changed by the vehicle occupant. Any suitable electronic equipment and connections can be used in conjunction with the lights.

In a third embodiment of the invention, the vehicle lighting system 10 provides safety lighting on one or more doors of the vehicle. Vehicle doors are often equipped with safety reflectors on the inside of the door, so that if the door is opened, the drivers of approaching vehicles will be alerted and can avoid colliding with the open door. The present invention provides a safety light on the vehicle door to replace or add to the safety reflector for alerting the viewer to an open door.

Figure 2:
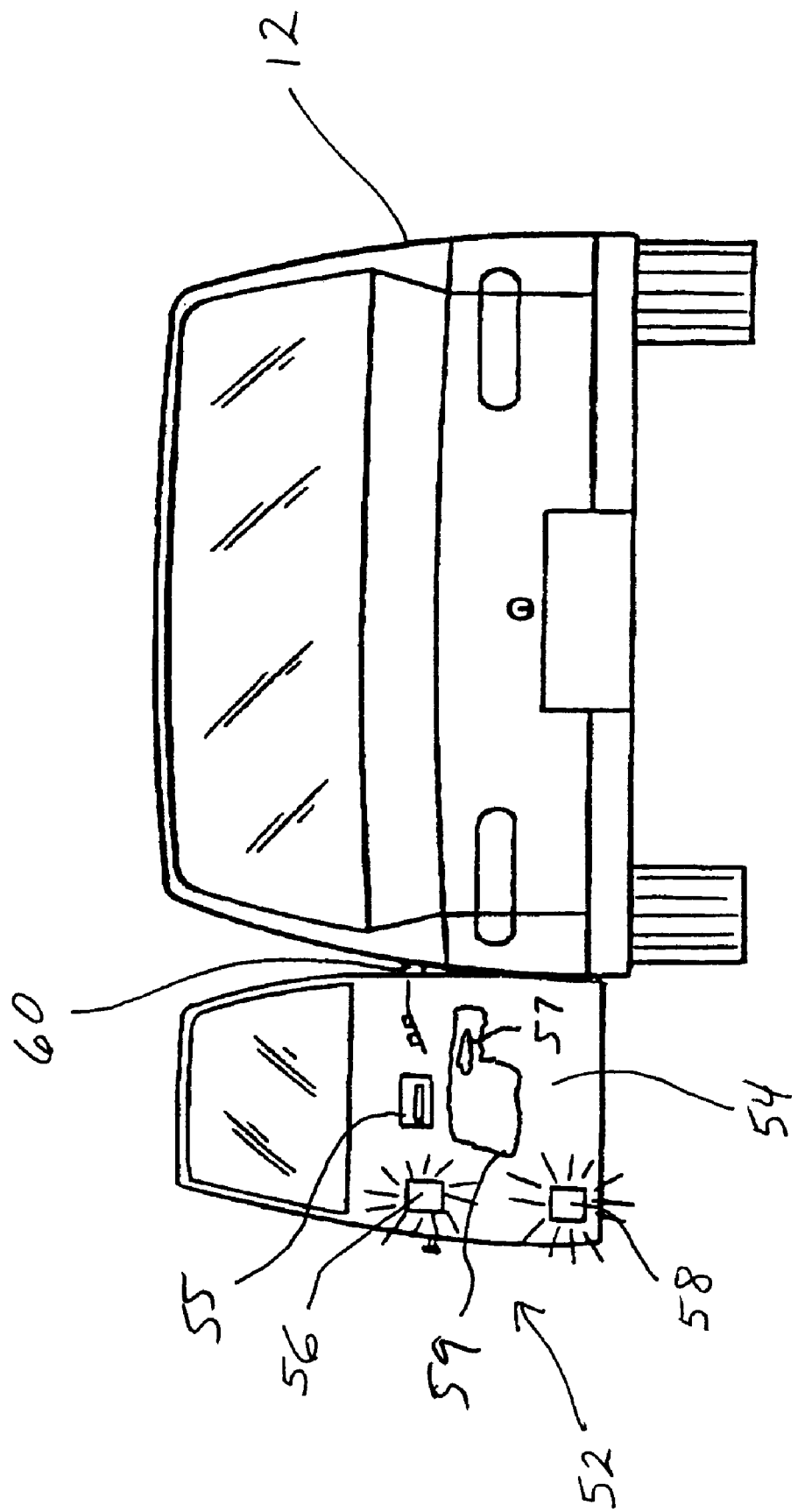
FIG. 2 is a schematic rearview of an automobile with an alternate lighting system according to the invention.

As shown in FIG. 2, a vehicle door lighting system according to the invention is indicated generally at 52. The door lighting system 52 includes one or more lights mounted on the vehicle door 54. The light can be mounted at any location on the door 54 suitable for alerting approaching vehicles. The light can also be mounted at any suitable location so as to additionally function as interior lighting or accent lighting. For example, the light can be mounted adjacent to a door opener 55, or grab handle 57 or adjacent to or within a storage bin 59. When used with the storage bin 59, the light could be emitted as a white light when a door of the storage bin is opened to light the interior thereof, or as a red light to alert passing vehicles if the vehicle door 54 is open. Preferably, at least one of the lights is mounted on the outermost portion of the door 54 when opened, so that the driver of an approaching vehicle will know how far the door 54 is extended from the vehicle. In the illustrated embodiment, a first door light 56 is mounted on the upper outside portion of the interior door panel, and a second door light 58 is mounted on the lower outside portion of the interior door panel. The door lights 56 and 58 can be any light emitting sources, such as those described above in relation to the first embodiment of the invention.

The vehicle door lighting system 52 also includes a door switch 60 which is triggered by the opening and the closing of the door 54, along with appropriate electrical devices and connections (not shown). When the door 54 moves to an open position, the door switch is triggered so that the door lights are actuated to emit a light having a first color. Preferably, the first color is a "safety light color," by which is meant a color which is highly visible for alerting approaching vehicles. Some nonlimiting examples of suitable safety light colors are red, orange, and green. When the vehicle door moves to a closed position, the door switch is triggered so that the door lights are actuated to emit a light having a second color. Preferably, the second color is a general illumination color or an accent color. By "general illumination color" is meant a color suitable for providing optimum lighting conditions in the vehicle, such as a white color or a yellow color. By "accent color" is meant a color which accents the features of the vehicle interior 14, as described above with respect to the second embodiment.

In the embodiment shown in FIG. 2, both of the door lights 56 and 58 could emit the safety light color when the door 54 is opened, and emit a color such as white when the door 54 is closed. The first door light 56 is located high on the vehicle door 54, so that it could be used as a reading light when the door 54 is closed. The second door light 58 is located low on the vehicle door 54, so that it could be used for accent lighting on the floor of the vehicle when the door 54 is closed.

The vehicle door lighting system 52 is not limited to use on the passenger doors of the vehicle. It can also be used on a vehicle hood, a trunk lid, a hatchback, or a lift gate or the like, all of which are included within the term "door" as used herein. For example, a vehicle lift gate could be equipped with a light that emits red light when the lift gate is opened to alert approaching vehicles, and emits white light when the lift gate is closed to illuminate the back compartment of the vehicle. The vehicle door lighting system 52 may include any suitable type, number and placement of the light emitting sources.

It should be understood that the vehicle lighting system 10 of the invention is operative to detect a first set of conditions and a second set of conditions, then actuate a light emitting source to emit a first color in response to the first set of conditions and a second color in response to the second set of conditions. The first color and the second color may be emitted in response to a first signal and a second signal, respectively. The first signal and the second signal may be generated by the sensor of the vehicle lighting system 10, although they may be generated by any suitable manner and in any suitable manner.

Nonlimiting examples of the first set of conditions includes the daytime conditions, and the position of the door, such as when the door is fully or partially opened or fully or partially closed. Another nonlimiting example of the first set of conditions includes the gear state of the vehicle. The term "gear state" is understood to include conditions such as when the vehicle is engaged in "park," "drive," "reverse" or the like. Yet another nonlimiting example of the first set of conditions includes detection of a weight or passenger is seated in the vehicle 12. Likewise, the first set of conditions includes the illumination level being above a predetermined value or whether the vehicle is in motion. A nonlimiting example of the first color includes the general illumination color.

Nonlimiting examples of the second set of conditions includes the daytime conditions, and the position of the door, such as when the door is not fully or partially opened or not fully or partially closed. Another nonlimiting example of the first set of conditions includes the gear state of the vehicle. The term "gear state" is understood to include conditions such as when the vehicle is disengaged from "park," "drive," "reverse" or the like. Yet another nonlimiting example of the second set of conditions includes detection of a weight or passenger is not seated in the vehicle 12. Likewise, the first set of conditions includes the illumination level below above a predetermined value or whether the vehicle is not in motion. A nonlimiting example of the second color includes the non-glare producing color.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle lighting system comprising:
   at least one sensor to detect a first set of conditions and a second set of conditions, wherein said first set of conditions includes an illumination level as detected by the at least one sensor; and
   a light emitting source being operable to illuminate selectively between a first color and a second color,
   wherein the light emitting source is adapted to be actuated at the first color in response to a first signal operatively generated by the at least one sensor indicating the first set of conditions, and the second color in response to a second signal operatively generated by the at least one sensor indicating the second set of conditions.

2. The vehicle lighting system of claim 1 where in the first signal is generated by the sensor.

3. The vehicle lighting system of claim 1 where in the second signal is generated by the sensor.

4. The vehicle lighting system of claim 1 wherein the first set of conditions includes a position of a vehicle door.

5. The vehicle lighting system of claim 1 wherein the first set of conditions includes a gear state of a transmission of the vehicle.

6. The vehicle lighting system of claim 1 further comprising a filter.

7. The vehicle lighting system of claim 1 further comprising a gear state of a transmission wherein the sensor is positioned and adapted to detect the gear state.

8. The vehicle lighting system of claim 1 wherein the light emitting source is adapted to be actuated to emit a first color in response to the first signal indicating that the illumination level is below a first predetermined value, and adapted to be actuated to emit a second color in response to a second signal indicating that the illumination level is above a second predetermined value.

9. The vehicle lighting system of claim 1 further comprising an interior floor, the light emitting source being positioned and adapted to illuminate the interior floor.

10. The vehicle lighting system of claim 1 wherein the light emitting source is manually movable between the first color and the second color.

11. The vehicle lighting system of claim 1 wherein the light emitting source is mounted in an overhead position within the vehicle interior.

12. The vehicle lighting system of claim 1 wherein the first set of conditions includes the vehicle being in motion and a first illumination level as detected by the sensor, and the second set of conditions includes the vehicle being stationary and one of the first and a second illumination level as detected by the sensor.

13. The vehicle lighting system of claim 1 wherein the light emitting source is a light emitting diode.

14. The vehicle lighting system of claim 1 wherein the light emitting source is a multi-colored light emitting diode.

15. The vehicle lighting system of claim 1 wherein the second color is a non-glare producing color.

16. The vehicle lighting system of claim 1 wherein the first set of conditions includes the vehicle being in motion, and the second set of conditions includes the vehicle being stationary.

17. The vehicle lighting system of claim 16 wherein one of the first and the second color is red.

18. A vehicle lighting system comprising:
   at least one sensor to detect a first set of conditions and a second set of conditions;
   a light emitting source being operable to illuminate selectively between a first color and a second color, wherein the light emitting source is adapted to be actuated at the first color in response to a first signal operatively generated by the at least one sensor indicating the first set of conditions, and the second color in response to a second signal operatively generated by the at least one sensor indicating the second set of conditions; and
   a seat, wherein the at least one sensor is positioned and adapted to detect a weight positioned in the seat.

19. A vehicle lighting system comprising:
   at least one sensor to detect a first set of conditions and a second set of conditions;
   a light emitting source being operable to illuminate selectively between a first color and a second color, wherein the light emitting source is adapted to be actuated at the first color in response to a first signal operatively generated by the at least one sensor indicating the first set of conditions, and the second color in response to a second signal operatively generated by the at least one sensor indicating the second set of conditions; and
   a vehicle door movable between a closed position and an open position such that the first and second set of conditions includes the position of the door, the light emitting source being positioned on the vehicle door, the light emitting source being adapted to be actuated to emit a light having a first color in response to the door being in the open position, and adapted to be actuated to emit a light having a second color in response to the door being in the closed position.

20. The vehicle lighting system of claim 19 wherein one of the first and the second color is red.

21. The vehicle lighting system of claim 14 wherein the light emitting source is a light emitting diode.

22. The vehicle lighting system of claim 14 wherein the light emitting source is a multi-colored light emitting diode.

23. The vehicle lighting system of claim 14 wherein the second color is a non-glare producing color.

24. The vehicle lighting system of claim 19 wherein the light emitting source is positioned on the vehicle door such that the light emitting source is visible to an approaching vehicle when the vehicle door is in the open position.

25. The vehicle lighting system of claim 19, wherein the light emitting source is further positioned on the vehicle door such that the light emitting source is visible to a vehicle occupant when the vehicle door is in the closed position.

26. A vehicle lighting system comprising:
   a light emitting source mounted on a vehicle door, the vehicle door movable between a closed position and an open position,
   wherein the light emitting source is further adapted to be actuated to emit the color red in response to the door being moved to the open position, and adapted to be actuated to emit a light having a second color in response to the door being moved to the closed position.

* * * * *